US007944864B2

(12) United States Patent
Amini et al.

(10) Patent No.: US 7,944,864 B2
(45) Date of Patent: May 17, 2011

(54) METHOD AND SYSTEM FOR SUPPORTING DYNAMIC STREAM ATTRIBUTES

(75) Inventors: Lisa Amini, Yorktown Heights, NY (US); Henrique Andrade, Croton-on-Hudson, NY (US); Yoonho Park, Chappaqua, NY (US); Philippe Selo, New York, NY (US); Chitra Venkatramani, Roslyn Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1382 days.

(21) Appl. No.: 11/445,889

(22) Filed: Jun. 1, 2006

(65) Prior Publication Data

US 2007/0280381 A1      Dec. 6, 2007

(51) Int. Cl.
*H04L 12/16* (2006.01)
*G06F 15/16* (2006.01)
*G06F 15/173* (2006.01)

(52) U.S. Cl. ......... 370/270; 370/420; 709/202; 709/246
(58) Field of Classification Search .................. 370/270; 709/202, 246, 232, 233, 234
See application file for complete search history.

(56) References Cited

U.S. PATENT DOCUMENTS

| 5,557,798 | A | 9/1996 | Skeen et al. |
| 6,735,633 | B1* | 5/2004 | Welch et al. ................... 709/233 |
| 6,910,033 | B2 | 6/2005 | Rosensblum |
| 7,171,441 | B2* | 1/2007 | Shiouchi et al. ............. 709/202 |
| 7,216,181 | B1* | 5/2007 | Jannu et al. ................... 709/246 |
| 2005/0262515 | A1* | 11/2005 | Dinh et al. ..................... 719/314 |
| 2007/0198641 | A1* | 8/2007 | Dorai et al. ................... 709/206 |

OTHER PUBLICATIONS

Mark Hapner, et al., "Java Message Service"; Sun Microsystems, Palo Alto, CA; Version 1.02b ; Aug. 27, 2001.

* cited by examiner

*Primary Examiner* — Chi H Pham
*Assistant Examiner* — Farah Faroul
(74) *Attorney, Agent, or Firm* — Tutunjian & Bitetto, P.C.; William Stock

(57) ABSTRACT

A publisher-subscriber system includes a broker configured to receive and distribute at least one data stream from publishers to subscribers in accordance with subscriptions. An annotator/classifier is configured to annotate or classify the data stream by employing one or more additional stream-level attributes to create an annotated data stream wherein the annotated data stream applies the stream-level attribute to all messages therein. Subscribers can subscribe to the annotated data stream created by the annotator/classifier.

19 Claims, 4 Drawing Sheets

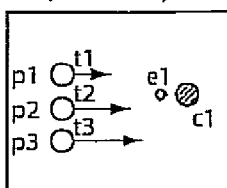
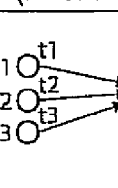
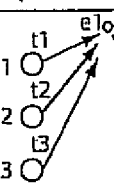
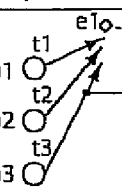
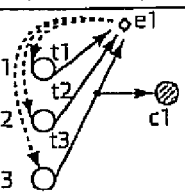
Fig. 1A (Prior Art)    Fig. 1B (Prior Art)    Fig. 1C (Prior Art)    Fig. 1D (Prior Art)    Fig. 1E (Prior Art)
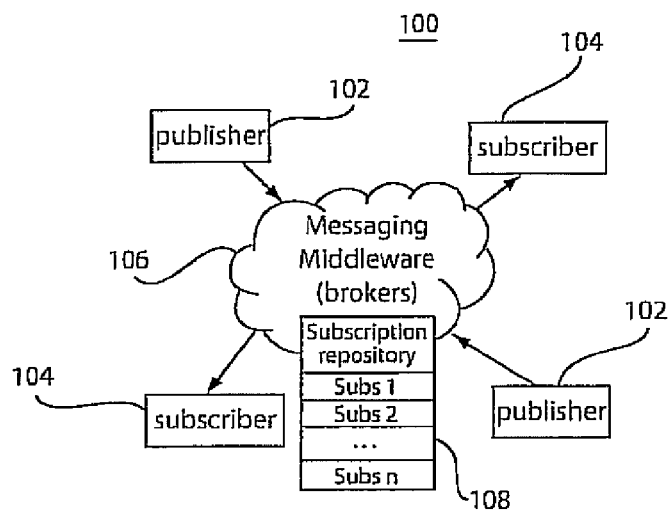
FIG. 2
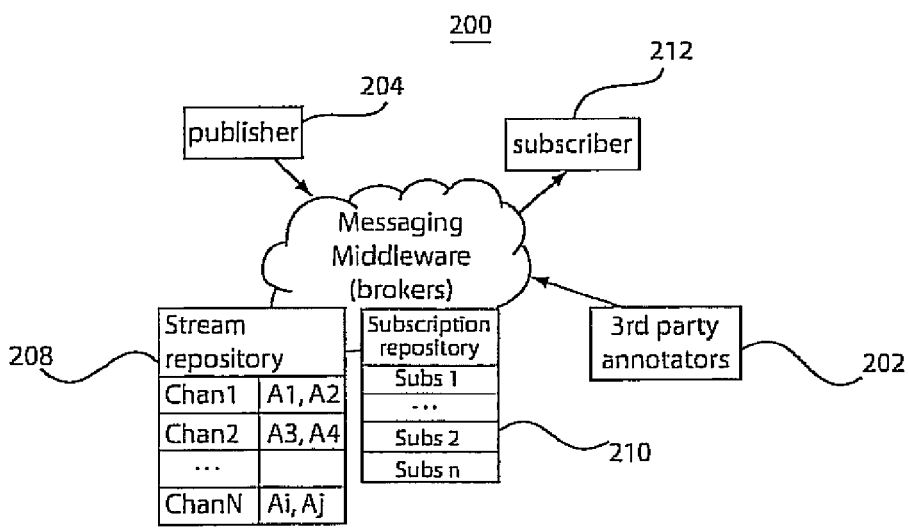
FIG. 3

METHOD AND SYSTEM FOR SUPPORTING DYNAMIC STREAM ATTRIBUTES

GOVERNMENT RIGHTS

This invention was made with Government support under Contract No.: H98230-05-3-0001 awarded by the U.S. Department of Defense. The Government has certain rights in this invention.

BACKGROUND

1. Technical Field

The present invention relates to event processing systems and methods and, more particularly, to content-based routing techniques for publish-subscribe or stream processing systems.

2. Description of the Related Art

Data is increasingly being generated digitally from data sources such as sensors, satellites, audio and video channels, and stock feeds. Data from such systems are typically communicated as the data are generated, i.e., as a data stream or message stream. There is a growing need for extracting information on a continuous basis from these streams to look for abnormal activity and other interesting phenomena.

Publish-subscribe (pub-sub) systems provide mechanisms to route messages to interested consumers. A key aspect to lessen the burden on the processing and communications infrastructure lies in the content-based routing system, which enables consumers to specify (i.e., subscribe to) those messages the consumers wish to receive.

In traditional pub-sub systems such as the one described in U.S. Pat. No. 5,557,798, messages are published to a channel name. Subscriptions may be expressed using channel names or by employing publisher-defined or system-defined attributes. For example, the JMS Specification (Version 1.0.2b Aug. 27, 2001) of SUN MICROSYSTEMS™ describes message attributes (or properties, in their lingo) as follows: (1) application-specific properties, (2) standard properties (i.e., optional header fields), and (3) provider-specific properties. In all cases, either the publisher or the infrastructure defines these properties and the properties are transmitted as part of the message. The subscriber defines a JMS message selector (or expression) specifying the messages it is interested in based on the message header properties. A message broker is responsible for accepting subscriptions from consumers and messages from producers, and for inspecting the message properties to determine to which consumers the message should be routed.

There has also been work on mediators in pub-sub and messaging systems such as the IBM® Websphere® Application Server v 6.0. A mediator is a piece of code which is always associated with a destination or a subscriber. Mediation code operates on a message as it traverses that destination. The two main functions of mediators are: (1) Transforming the message data from one message content format to another. This is especially important if the sender and the receiver of a message do not support exactly the same message format. A mediator can be written to perform the necessary transformation using, for example, an XSLT stylesheet. (2) Making routing decisions. A mediator can read the content of a message and, based on this content, route the message to different destinations.

Referring to FIGS. 1A-1E, consider the case of three represented message producers (p1, p2, p3). In this scenario, each producer (p1, p2, p3) is a sensor monitoring an entity, publishing messages to a topic (t1, t2, t3). Alternatively, p1-p3 could publish to a single topic and identify the producer via a message property. In this example, the t1-t3 scenario will be used. For the consumer (c1), the streams are equivalent (i.e., report on the same entity and vary only by the "quality" of measurements, where quality is some application defined metric, such as signal to noise ratio), and thus c1 need only process one of the streams. An entity e1 evaluates the quality of the streams.

In traditional pub-sub systems, e1 would likely be deployed as part of the consumer c1 (see FIG. 1B). Thus, c1 would likely subscribe to all 3 streams, evaluate the quality of each stream and select the stream with the highest quality for further processing. When or if the selected stream no longer represented the highest quality input, c1 would switch to the appropriate stream. The problem with this solution is that each consumer with the same requirement must receive all 3 streams and perform this same evaluation.

This duplicate processing and transmission can be avoided, as in FIG. 1C, by deploying e1 as a consumer or as a mediator that subscribes to all three streams and publishes the messages of the stream with the highest quality (e1 might do so by publishing to a new topic, t4, or by adding a quality property to messages from the selected stream). The problem in this case is duplicate transmission of the high quality stream (i.e., it is published by both the original producer and by e1).

This duplicate transmission can be avoided by having e1 transmit its evaluation to c1 (FIG. 1D) and c1 alters its subscription accordingly, or to p1-p3 (FIG. 1E) and the producers append the evaluation as a property to the stream (c1's subscription would specify the property representing the highest quality). The problem in both of these cases is that e1's communication with either c1 or p1-p3 is application-specific, i.e., because no services are provided by the system to address this, the application providers must develop their own signaling mechanism to reflect changes in interest.

SUMMARY

A publisher-subscriber system includes a broker configured to receive and distribute at least one data stream from publishers to subscribers in accordance with subscriptions. An annotator/classifier is configured to annotate or classify the data stream by employing one or more additional stream-level attributes to create an annotated data stream wherein the annotated data stream applies the stream-level attribute to all messages therein such that subscribers can subscribe to the annotated data stream created by the annotator/classifier.

Another method for creating streams with externally defined attributes includes classifying a data stream based upon information related to the data stream. Using a third party annotator, the data stream is annotated to create an enhanced data stream by adding a stream-level attribute. A stream repository is updated with the enhanced data stream having the stream level attribute added thereto. The enhanced data stream is forwarded to subscribers based on at least the stream-level attribute.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIGS. 1A-1E schematically show a plurality of publisher to subscriber scenarios in accordance with conventional systems;

FIG. 2 is a block diagram showing a conventional publisher-subscriber architecture;

FIG. 3 is a block diagram showing a publisher-subscriber architecture in accordance with one illustrative embodiment;

DETAILED DESCRIPTION OF PREFERRED EMBODIMENTS

Figure 4:
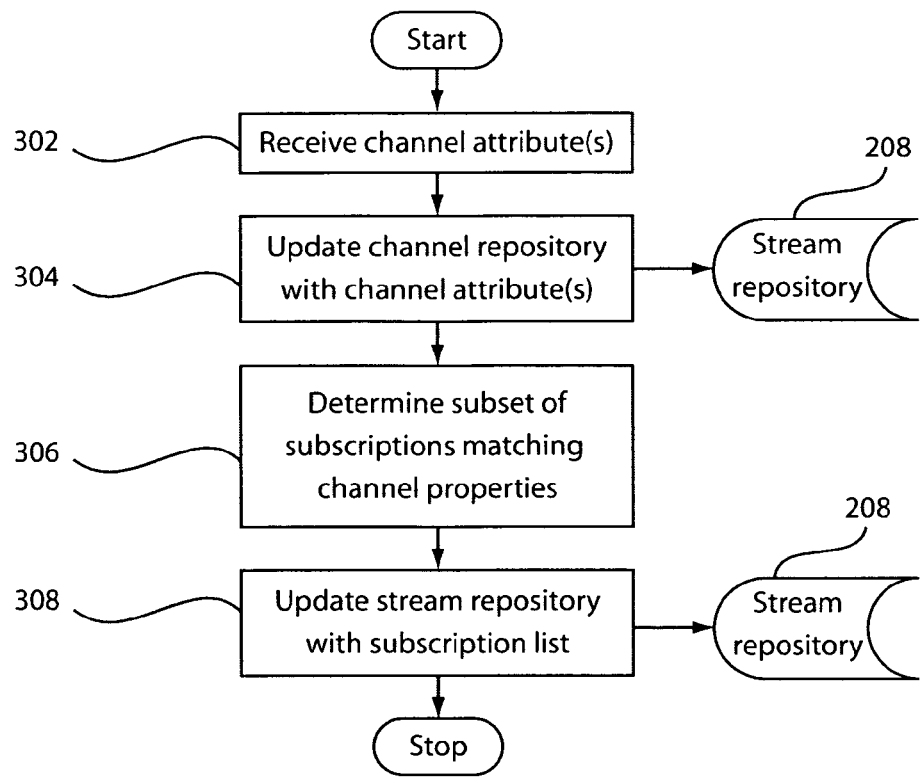
FIG. 4 is a block/flow diagram showing a stream-level attribute update from a third party annotator in accordance with an illustrative embodiment.

A method and system are described, which permit external entities, also called third party annotators, unrelated to the publishers and subscribers, to register and dynamically update qualitative and quantitative attributes for data streams. Such attributes may, for example, associate a semantic concept with a stream, assign a quality ranking to a stream, provide quantitative metrics (e.g., average bandwidth, quality ranking), etc. These registered attributes, similar to system-defined or publisher-defined attributes, may also be used by subscribers to specify the streams and messages properties they intend to receive.

Additionally, the registered attributes and the association with streams may happen at any time during the stream lifetime. For example, an attribute denoting a semantic concept associated with a stream can be created and associated with the stream by another subscriber on-the-fly.

Since attributes at the stream level apply to all messages that comprise the stream, the attributes need not be embedded in each message, nor evaluated by the message broker on a per-message basis. In a preferred embodiment, a pub-sub infrastructure is augmented in such a way that it incorporates an apparatus or mechanism needed to manage the externally defined stream attributes. These attributes appear to the routing infrastructure as any other attributes the system normally supports. An example of a conventional pub-sub infrastructure is described in detail in U.S. Pat. No. 6,910,033, incorporated herein by reference.

Embodiments of the present invention provide (1) a way of registering features defined as attributes and optionally their values to streams outside of the realm of the publisher and the routing infrastructure; (2) a system and method for evaluating these attributes when specified in subscription expressions used by subscribers to define the streams or messages they wish to receive.

Embodiments of the present invention can take the form of an entirely hardware embodiment, an entirely software embodiment, or an embodiment including both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

In preferred embodiments, routing infrastructure in a pub-sub system, such as, e.g., one provided by JMS™, is implemented using stream attributes in accordance with features of the present invention. Subscriptions are specified across the attributes of the stream as well as the format of the stream, which may be defined in terms of message attributes. In a traditional implementation, all attributes of the stream are included in each message and a broker compares the message against the subscription. In accordance with a preferred embodiment, the messages still include all the attributes-stream-level as well as message-level, but the broker performs more efficient routing by performing a two-tier evaluation.

The broker initially inspects subscription attributes defined at the stream level and determines which streams match. Since stream-level attributes are invariant for all messages that belong to that stream, the broker just checks the subscriptions against format-level attributes, thereby conserving computational resources.

Referring to FIG. 2, a traditional pub-sub system architecture 100 is illustratively shown. Publishers 102 publish messages with attributes they populate, to topics determined by the publisher. Additionally, there may be some system-inserted attributes such as a publication timestamp that each message carries. Subscribers 104 specify their subscriptions in terms of topics or channels and may additionally provide logical expressions over application-inserted as well as system-inserted attributes to further filter the messages. A broker or set of brokers 106 that constitute the messaging middleware assimilate all subscriptions 108 and are responsible for routing the published messages to the matching subscribers. Each message is matched independently in such systems. In this description, topic, channel, and stream are employed interchangeably.

Referring now to the drawings in which like numerals represent the same or similar elements and initially to FIG. 3, a pub-sub system architecture 200 is illustratively shown in accordance with present principles. The architecture 200 permits $3^{rd}$-party annotators 202 other than a publisher 204 or the system to add attributes that are applicable at the stream-level. That is, a value of an attribute is not tied directly to a specific message or messages in a stream. The attribute (A) may have a single value for all messages published to that stream, or, if the value of the attribute does change over the life of the stream, there is no guarantee that the value will be applied to the evaluation of a specific message. This enables schemes in which a broker 206 tracks stream-level attributes A1, A2, etc. in a stream repository 208 and thus can make the matching process more efficient. This enables filtering based on many new features such as stream-ranking, semantic attributes of the stream, etc., and can result in significant savings in the matching process.

Subscribers 212 specify their subscriptions in terms of topics or channels and may additionally provide logical expressions over application-inserted as well as system-inserted attributes to further filter the messages. A subscription repository 210 at broker 206 is employed to assimilate all subscriptions sub1, sub2, etc. for routing the published messages to the matching subscribers 212.

When applied to the pub-sub paradigm, embodiments can be employed by the brokers 206 as follows. There are at least two processes that the messaging middleware (206) implements. The first includes the processing of the stream-level attributes. The flow is illustrated in FIG. 4.

Any $3^{rd}$-party annotator 202 may subscribe to a stream to determine some common property of all the messages in the stream. The annotator 202 may process some messages and determine that they share a common attribute-value. The annotator 202 then sends this attribute-value to the broker 206 and the broker 206 stores this information in a stream repository 208, which is where the broker 206 stores per-stream information. In one example, channels and corresponding attributes are correlated and stored.

Figure 5:
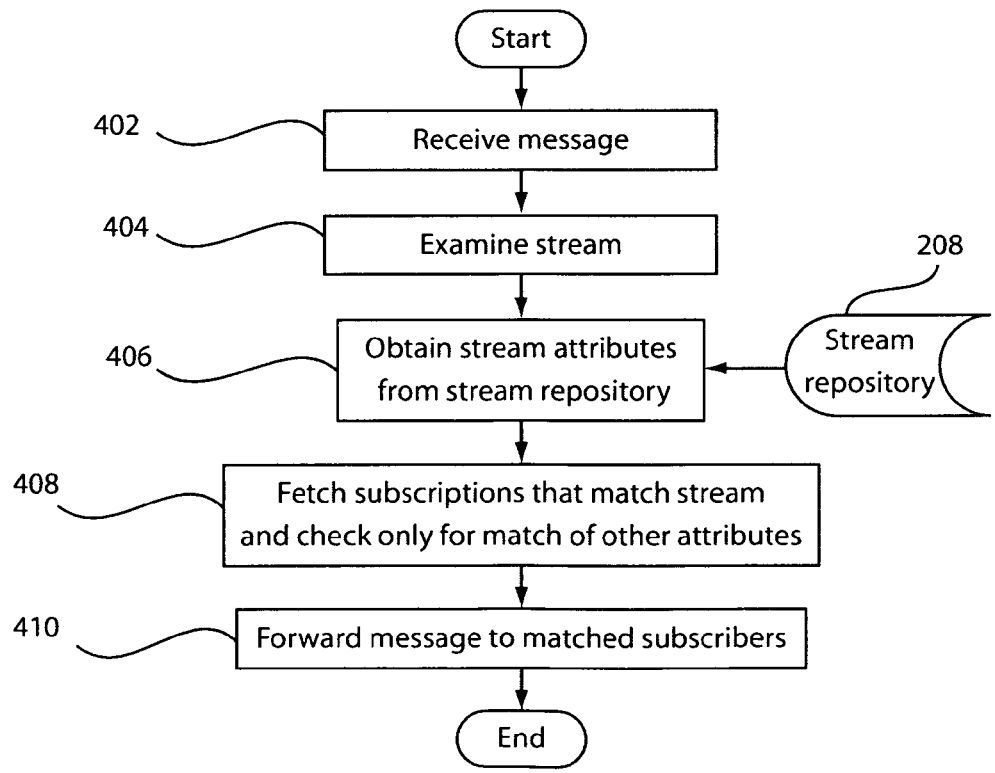
FIG. 5 is a block/flow diagram showing the matching of an incoming message against subscriptions using stream attributes provided by third party annotators.

The second process is that of subscription matching using the stream-level attributes when a message is received. This is illustrated in FIG. 5. When a message is published to a stream by a publisher 204, the broker 206 is already aware of the values of the stream-level attributes since these are invariant for all the messages on this stream. It can then skip checking messages for the values of these attributes during the subscription-matching process, thereby making it more resource efficient.

An additional optimization that can be employed by brokers 206 (indicated in FIGS. 4 and 5) is to narrow down the subscription-space on a per-stream basis, using the stream-level attributes. That is, when the broker 206 has a stream-level attribute, the broker 206 can use that attribute to pre-determine a subset of the subscriptions that may match this stream, thereby reducing the search-space for messages on that stream.

Referring to FIG. 4, a method for a stream-level attribute-update from third party annotators is illustratively shown. In block 302, channel attributes are received by an external entity (e.g., a classifier or a third party annotator). This may include determining a commonality between messages, channel characteristics or any other criteria that can identify a data stream or groups of messages therein. In block 304, a channel repository (e.g., in the stream repository 208) is updated with the classified channel attributes. A subset of subscriptions matching the channel properties/attributes are identified, in block 306. In block 308, the stream repository 208 is updated with the new subscription list, which includes the updated attributes received from the third party annotator. The enhanced stream (with the new attributes) can be distributed to subscribers using the additional attribute.

Referring to FIG. 5, a matching method is illustratively shown for matching incoming messages against subscriptions using stream attributes provided by third party annotators. In block 402, a message or messages are received by the broker. The broker examines the stream in block 404. In block 406, the broker determines the stream attributes from the stream repository 208. In block 408, the broker fetches subscriptions that match the stream. In one embodiment, the broker may check only for matches with updated attributes. In block 410, the message is forwarded to matched subscribers.

Figure 6:
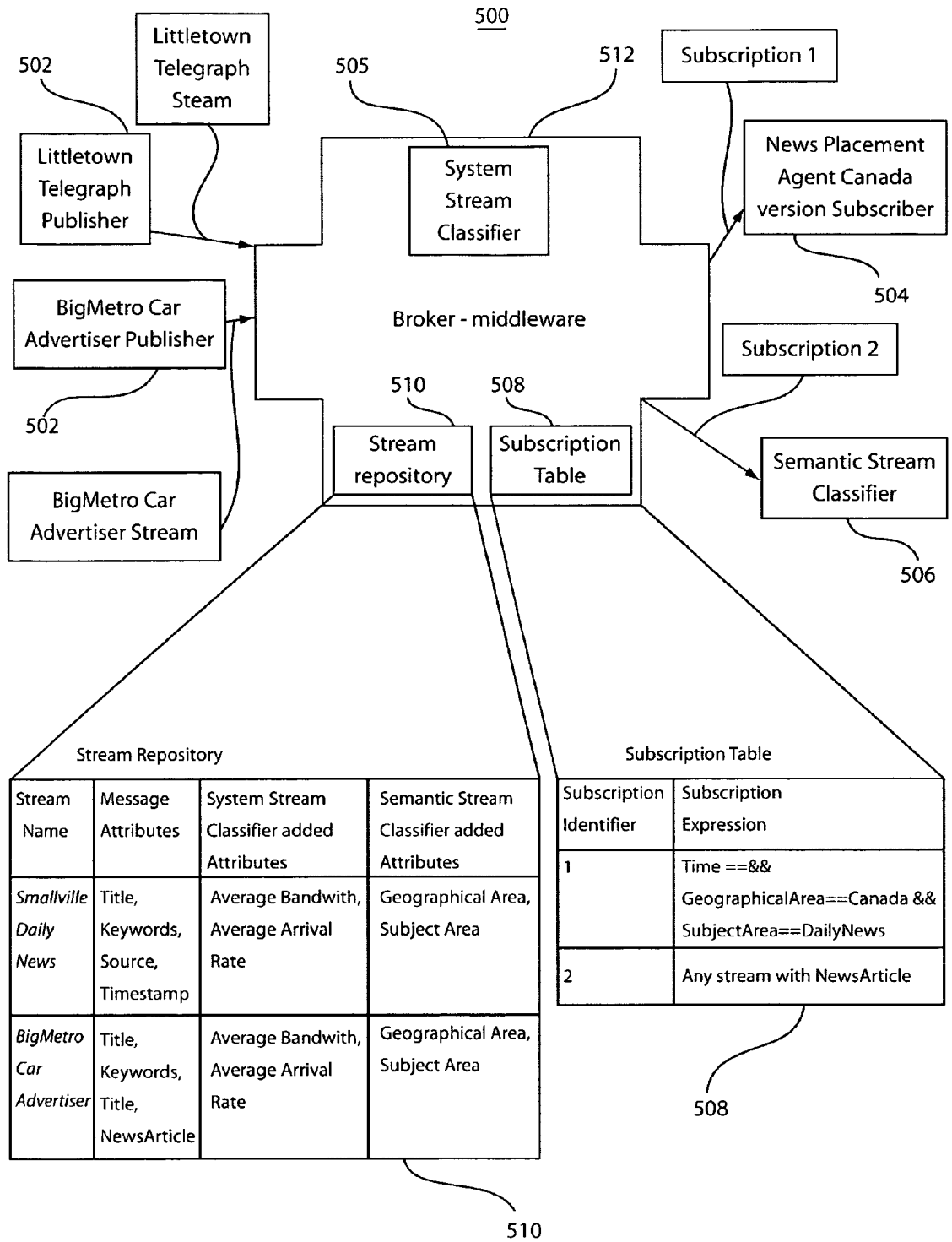
FIG. 6 is a block diagram of an illustrative system employing third party annotators in accordance with an example.

Referring to FIG. 6, an example use case for one useful method is illustratively shown. Multiple publishers 502 are able to produce streams including news items, e.g., every message carries a news item with a possibly predefined set of attributes about the news item itself. There is also a collection of subscribers 504 that subscribe to messages using a subscription expression. Two instances of a stream classifier component are also depicted.

The stream classifiers include a system stream classifier 505 and a semantic stream classifier 506, which correspond to third party annotators as described above. These third party annotators (classifiers 505 and 506) create additional stream-level attributes. Stream classifiers 505 and 506 may exist as standalone components (e.g., as an administrative tool) or as parts of other system components (e.g., part of a publisher, part of an infrastructure routing daemon, etc.). These additional stream-level attributes and their values are incorporated and managed by a broker 512 along with the original stream attributes in a stream repository 510. The classifier 505 monitors the stream for resource characteristics and adds steam-level attributes such as streaming-bandwidth, bandwidth consumption, message traffic rates, message interarrival-rate, etc. The classifier 506 samples the stream and adds stream-level attributes describing the semantic contents of the stream, for example, its subject area or language. A subscription table 508 (held by the broker-middleware 512) shows a list of subscriptions, where the expressions include a mix of publisher-defined attributes along with the added stream attributes (e.g., the stream classifier's attributes).

In this scenario, once a message is published, the broker 512 inspects the current subscriptions, evaluates their expressions, and decides if and where a message should be delivered.

Figure 7:
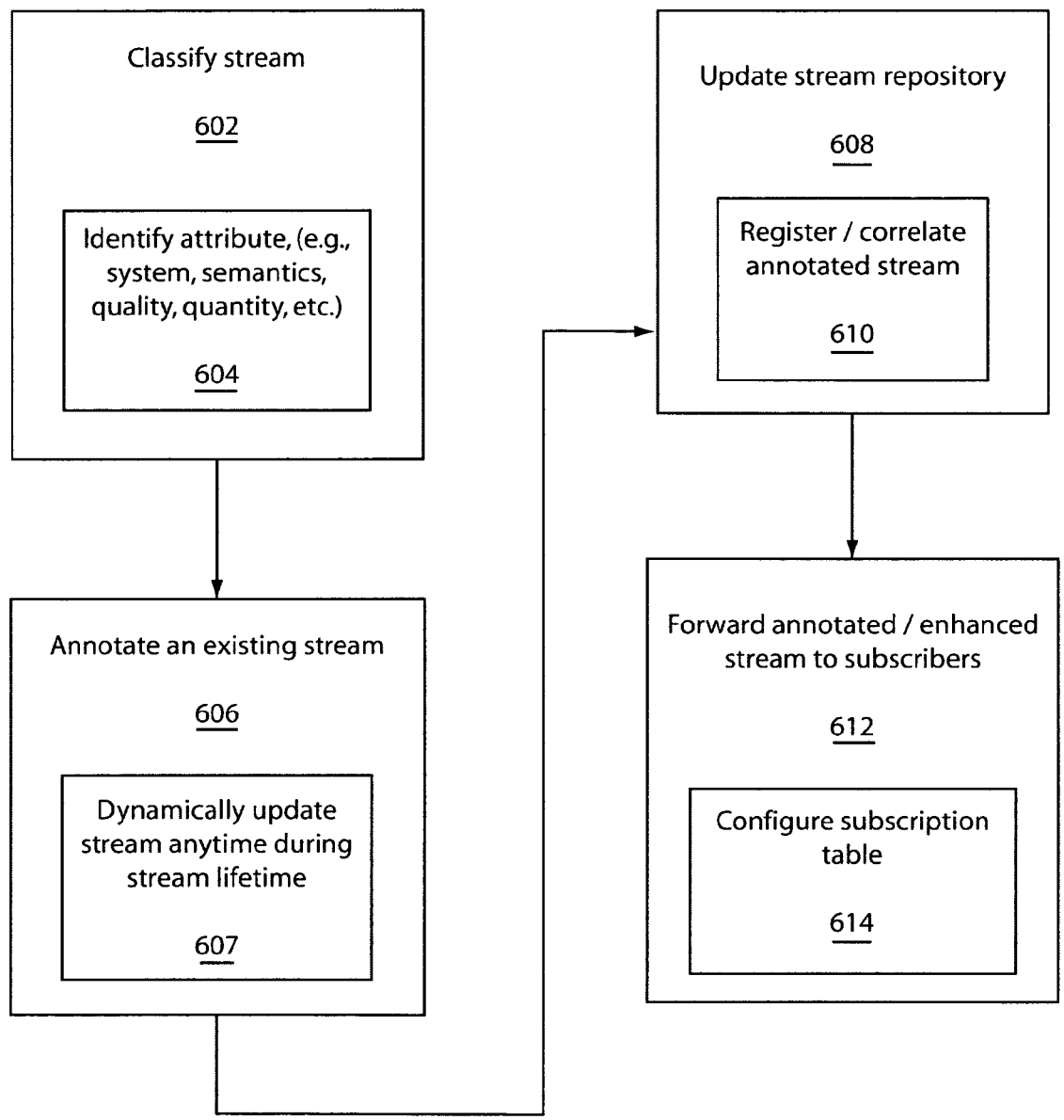
FIG. 7 is a block/flow diagram showing a system/method for creating streams with externally defined attributes in accordance with one illustrative embodiment.

Referring to FIG. 7, a system/method 600 for creating streams with externally defined attributes is illustratively depicted in accordance with an alternative exemplary embodiment. In block 602, a data stream is classified based upon information related to the data stream. This information may include identifying at least one of semantic attributes, system attributes, qualitative attributes, and quantitative attributes of a data stream in block 604. In block 606, a third party annotator (or other external entity) annotates an existing data stream to create an enhanced data stream by adding a stream-level attribute. The third party annotator is preferably unrelated to other publishers and subscribers in the system. However, the third party annotators may be collocated with subscribers and/or publishers. The third party annotators may be remotely disposed from other entities in the system. The data stream may be annotated to create the enhanced data stream by dynamically updating a stream at any time during the stream lifecycle (block 607).

The stream-level attribute or attributes are based upon one or more identified attributes. System attributes may include, e.g., bandwidth, arrival rates or delays, encryption types, transmission media type, etc. Semantic attributes may include, e.g., geographical data, subject area, content information, etc. Qualitative attributes may include, e.g., signal to noise information, error information, signal strength, etc. Quantitative information may include, e.g., the age of the message, the number of messages, metrics, etc.

In block 608, a stream repository is updated with the enhanced data stream having the stream level attribute added thereto. This may include registering, in block 610, the enhanced data stream in the stream repository and correlating at least one stream in accordance with a stream-level attribute.

In block 612, the enhanced data stream is forwarded to subscribers based on at least one stream-level attribute. This may include configuring a subscription table, in block 614, to correlate streams with subscribers based on attributes including the enhanced data with the stream-level attribute.

Having described preferred embodiments of a system and method for supporting dynamic stream attributes (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A publisher-subscriber system stored on a computer-readable storage medium, comprising:
    a broker configured to receive and distribute at least one data stream from publishers to subscribers in accordance with subscriptions, wherein distributing the at least one data stream to subscribers includes determining subscribers which are to receive the at least one data stream, at least in part, by using a stream-level attribute which has been appended to the at least one data stream to filter a set of subscriptions associated with the subscribers; and
    a classifier configured to extend a data stream with the stream-level attribute creating an annotated data stream wherein the annotated data stream applies the stream-level attribute to all messages therein, wherein subscribers can subscribe to the annotated data stream created by the classifier.

2. The system as recited in claim 1, wherein the classifier includes a semantic stream classifier and identifies semantic attributes of a data stream.

3. The system as recited in claim 1, wherein the classifier includes a system stream classifier and identifies system attributes of a data stream.

4. The system as recited in claim 1, wherein the broker includes a stream repository configured to correlate streams with attributes, wherein the stream repository permits registration of the stream-level attribute and correlates the stream-level attribute with streams listed in the stream repository.

5. The system as recited in claim 1, wherein the broker includes a subscription table configured to correlate streams with subscribers based on attributes including the stream-level attribute.

6. The system as recited in claim 1, wherein the classifier is unrelated to publishers and subscribers.

7. The system as recited in claim 1, wherein the stream-level attribute includes one or more of a qualitative attribute, a quantitative attribute, a system attribute, and a semantic concept attribute.

8. A method for creating streams with externally defined attributes:
    classifying a data stream based upon information related to the data stream;
    using a third party annotator, annotating the data stream to create an enhanced data stream by adding a stream-level attribute;
    updating a stream repository with the enhanced data stream having the stream-level attribute added thereto;
    determining subscribers which are to receive the enhanced data stream, at least in part, by filtering a set of subscriptions associated with the subscribers using the stream-level attribute; and
    forwarding the enhanced data stream to subscribers.

9. The method as recited in claim 8, wherein classifying includes identifying at least one of semantic attributes, system attributes, qualitative attributes, and quantitative attributes of a data stream.

10. The method as recited in claim 8, wherein updating a stream repository includes registering the enhanced data stream in a stream repository and correlating at least one stream in accordance with the stream-level attribute.

11. The method as recited in claim 8, wherein forwarding the enhanced data stream to subscribers includes configuring a subscription table to correlate streams with subscribers based on attributes including the enhanced data with the stream-level attribute.

12. The method as recited in claim 8, wherein the third party annotator is unrelated to other publishers and subscribers in a system.

13. The method as recited in claim 8, wherein annotating the data stream to create an enhanced data stream includes dynamically updating a stream at any time during the streams lifecycle.

14. A computer program product comprising a computer-readable storage medium storing a computer executable program, wherein the computer executable program when executed on a computer causes the computer to perform method steps for creating streams with externally defined attributes including:
    classifying a data stream based upon information related to the data stream;
    using a third party annotator, annotating the data stream to create an enhanced data stream by adding a stream-level attribute;
    updating a stream repository with the enhanced data stream having the stream level attribute added thereto;
    determining subscribers which are to receive the enhanced data stream, at least in part, by filtering a set of subscriptions associated with the subscribers using the stream-level attribute; and
    forwarding the enhanced data stream to subscribers.

15. The computer program product as recited in claim 14, wherein classifying includes identifying at least one of semantic attributes, system attributes, qualitative attributes, and quantitative attributes of a data stream.

16. The computer program product as recited in claim 14, wherein updating a stream repository includes registering the enhanced data stream in a stream repository and correlating at least one stream in accordance with stream-level attributes.

17. The computer program product as recited in claim 14, wherein forwarding the enhanced data stream to subscribers includes configuring a subscription table to correlate streams with subscribers based on attributes including the enhanced data with stream-level attributes.

18. The computer program product as recited in claim 14, wherein the third party annotator is unrelated to other publishers and subscribers in a system.

19. The computer program product as recited in claim 14, wherein annotating the data stream to create an enhanced data stream includes dynamically updating a stream at any time during the stream lifecycle.

* * * * *